United States Patent
Blasinski et al.

(10) Patent No.: US 9,827,842 B2
(45) Date of Patent: Nov. 28, 2017

(54) METHOD FOR OPERATING A HYBRID DRIVE DEVICE FOR A MOTOR VEHICLE

(71) Applicant: AUDI AG, Ingolstadt (DE)

(72) Inventors: Boris Blasinski, Gaimersheim (DE); Rene Kasteneder, Münchsmünster (DE)

(73) Assignee: Audi AG, Ingolstadt (DE)

( * ) Notice: Subject to any disclaimer, the term of this patent is extended or adjusted under 35 U.S.C. 154(b) by 252 days.

(21) Appl. No.: 14/762,710

(22) PCT Filed: Dec. 21, 2013

(86) PCT No.: PCT/EP2013/003932
§ 371 (c)(1),
(2) Date: Jul. 22, 2015

(87) PCT Pub. No.: WO2014/114321
PCT Pub. Date: Jul. 31, 2014

(65) Prior Publication Data
US 2015/0367719 A1    Dec. 24, 2015

(30) Foreign Application Priority Data
Jan. 23, 2013    (DE) .......................... 10 2013 001 095

(51) Int. Cl.
*B60K 6/48*    (2007.10)
*B60K 6/448*    (2007.10)
(Continued)

(52) U.S. Cl.
CPC ................ *B60K 6/48* (2013.01); *B60K 6/442* (2013.01); *B60K 6/448* (2013.01); *B60K 6/52* (2013.01);
(Continued)

(58) Field of Classification Search
CPC ...................................................... B60W 20/17
See application file for complete search history.

(56) References Cited

U.S. PATENT DOCUMENTS 6,278,195 B1 *   8/2001   Yamaguchi ........... B60W 20/10
                                                              290/40 A
6,359,404 B1 *   3/2002   Sugiyama ................ B60K 6/48
                                                              180/65.25

(Continued)

FOREIGN PATENT DOCUMENTS

CN    101659202 A    3/2010
CN    101913322 A    12/2010

(Continued)

OTHER PUBLICATIONS

Chinese Search Report issued by the Chinese Patent Office dated Jan. 3, 2017 in counterpart Chinese Patent Application No. 201380071120.4.

(Continued)

*Primary Examiner* — Brian L Swenson
(74) *Attorney, Agent, or Firm* — Henry M. Feiereisen LLC

(57) ABSTRACT

A method for operating a hybrid drive device of a motor vehicle is disclosed, wherein the hybrid drive device includes an internal combustion engine, which can be operatively connected to a first axle of the motor vehicle, a first electric motor, which can also be operatively connected to the first axle of the motor vehicle, and a second electric motor, which can be operatively connected to a second axle of the motor vehicle. The electrical energy used for operating the second electric motor is generated in a first mode of operation by the first electric motor driven by the internal combustion engine while increasing the output of the internal combustion engine, and in a second mode of operation (Continued)

is derived exclusively from an energy storage device for electrical energy.

8 Claims, 1 Drawing Sheet

(51) Int. Cl.
| | | |
|---|---|---|
| *B60K 6/52* | (2007.10) | |
| *B60W 10/06* | (2006.01) | |
| *B60W 10/08* | (2006.01) | |
| *B60W 10/24* | (2006.01) | |
| *B60W 20/20* | (2016.01) | |
| *B60K 6/442* | (2007.10) | |
| *B60W 20/17* | (2016.01) | |

(52) U.S. Cl.
CPC ............ *B60W 10/06* (2013.01); *B60W 10/08* (2013.01); *B60W 10/24* (2013.01); *B60W 20/17* (2016.01); *B60W 20/20* (2013.01); *B60W 2510/083* (2013.01); *B60W 2510/244* (2013.01); *Y02T 10/6234* (2013.01); *Y02T 10/6243* (2013.01); *Y02T 10/6265* (2013.01); *Y02T 10/6286* (2013.01); *Y10S 903/903* (2013.01)

(56) References Cited

U.S. PATENT DOCUMENTS

| | | |
|---|---|---|
| 6,484,833 B1 | 11/2002 | Chhaya et al. |
| 8,676,423 B2 | 3/2014 | Blasinski et al. |
| 2001/0029220 A1* | 10/2001 | Kato ...................... B60K 6/365 477/5 |
| 2006/0086546 A1* | 4/2006 | Hu .......................... B60K 6/48 180/65.25 |
| 2006/0173593 A1 | 8/2006 | Anderson |
| 2009/0160274 A1 | 6/2009 | Aikawa et al. |
| 2010/0138090 A1 | 6/2010 | Jinno et al. |
| 2011/0094809 A1 | 4/2011 | Poschmann et al. |
| 2011/0276251 A1* | 11/2011 | Kang ...................... B60K 6/48 701/103 |
| 2012/0010041 A1 | 1/2012 | Soliman et al. |
| 2012/0136519 A1* | 5/2012 | Suzuki .................. B60W 20/00 701/22 |
| 2012/0208672 A1* | 8/2012 | Sujan .................... B60W 10/02 477/5 |
| 2013/0211642 A1 | 8/2013 | Blasinski et al. |
| 2013/0226389 A1* | 8/2013 | Yamazaki ............. B60K 6/445 701/22 |

FOREIGN PATENT DOCUMENTS

| | | |
|---|---|---|
| CN | 102092272 A | 6/2011 |
| CN | 102745061 A | 10/2012 |
| CN | 202491672 U | 10/2012 |
| DE | 10 2005 048 501 | 5/2007 |
| DE | 11 2006 002 515 | 8/2008 |
| DE | 10 2007 046 584 | 4/2009 |
| DE | 11 2007 003 180 | 11/2009 |
| DE | 10 2010 018 987 | 1/2011 |
| DE | 10 2009 050 957 | 5/2011 |
| DE | 10 2011 078 498 | 4/2012 |
| WO | WO 2008/047029 | 4/2008 |
| WO | WO 2012/000806 | 1/2012 |

OTHER PUBLICATIONS

English translation of Chinese Search Report issued by the Chinese Patent Office dated Jan. 3, 2017 in counterpart Chinese Patent Application No. 201380071120.4.
International Search Report issued by the European Patent Office in International Application PCT/EP2013/003932.

\* cited by examiner

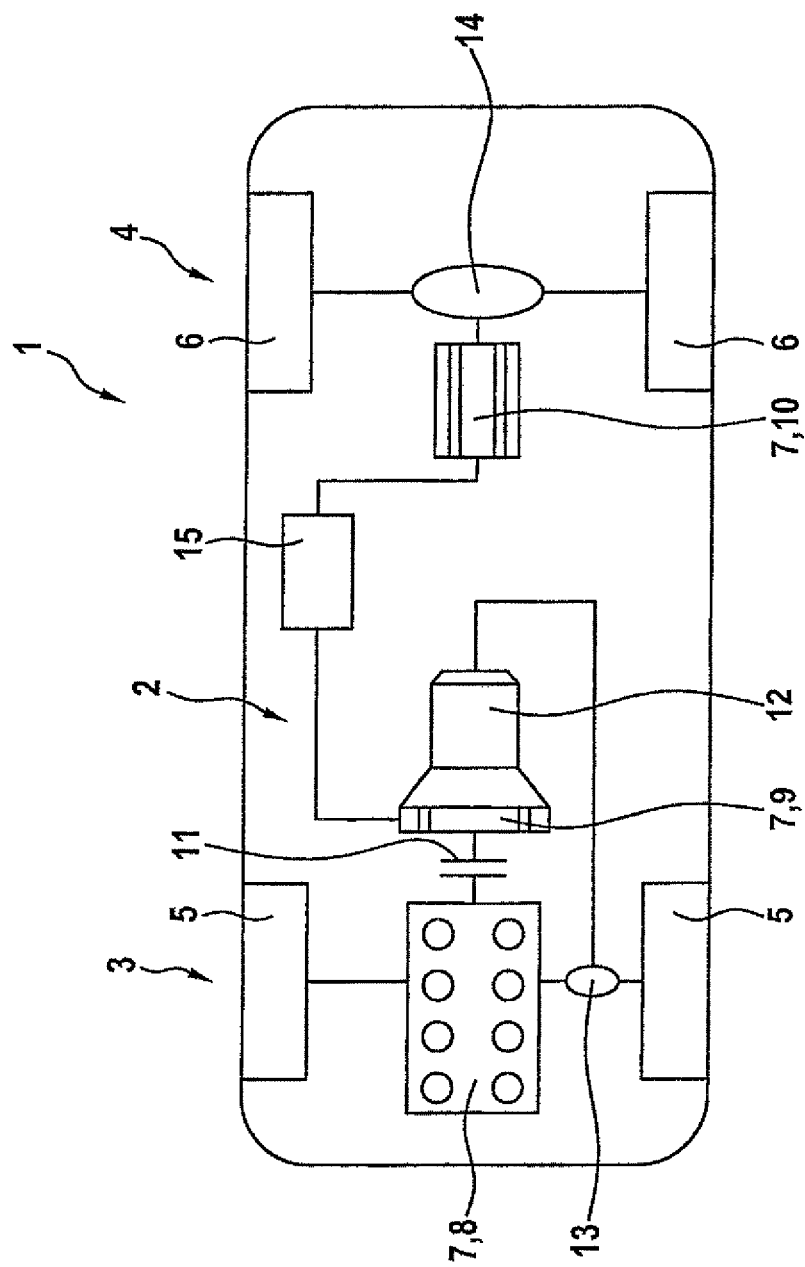

METHOD FOR OPERATING A HYBRID DRIVE DEVICE FOR A MOTOR VEHICLE

CROSS-REFERENCES TO RELATED APPLICATIONS

This application is the U.S. National Stage of International Application No. PCT/EP2013/003932, filed Dec. 21, 2013, which designated the United States and has been published as International Publication No. WO 2014/114321 and which claims the priority of German Patent Application, Serial No. 10 2013 001 095.0, filed Jan. 23, 2013, pursuant to 35 U.S.C. 119(a)-(d).

BACKGROUND OF THE INVENTION

The invention relates to a method for operating a hybrid drive device of a motor vehicle, wherein the hybrid drive device has an internal combustion engine which can be operatively coupled with a first axle of the motor vehicle, a first electric motor which can also be operatively coupled with the first axle, and a second electric motor which can be operatively coupled with a second axle of the motor vehicle. The invention also relates to a hybrid drive device of a motor vehicle and a corresponding motor vehicle.

The hybrid drive device serves for driving the motor vehicle and for this purpose has multiple drive aggregates, of which at least two are of a different type. One of the drive aggregates is for example constructed as an internal combustion engine, while the first electric motor and the second electric motor represent further ones of the drive aggregates. The motor vehicle has at least two axles, i.e., the first axle and the second axle. The internal combustion engine and the first electric motor can be or are operatively connected with the first axle. For example, a separating clutch is present in the operative connection between the first axle and the internal combustion engine, so that the operative connection can be at least temporarily interrupted. The first electric motor is preferably permanently operatively connected with the first axle. As an alternative, however, also in this case a separating clutch can be provided in the operative connection between the first electric motor and the first axle of the motor vehicle. The second electric motor can be or is operatively connected with the second axle of the motor vehicle. Preferably, as described above for the first electric motor, this is permanently the case. However, as an alternative, a separating clutch can also be provided in this case between the second electric motor and the second axle.

The motor vehicle has thus at least two drivable axles, because the first axle can be driven with the internal combustion engine, the first electric motor or with both the internal combustion engine and the electric motor. The second axle on the other hand can be driven by means of the second electric motor. The term "driving" means in this context providing a torque of any direction at the respective axle. The torque can thus be directed to an acceleration as well as deceleration of the motor vehicle. Particularly preferably, the first axle and the second axle are the only axles of the motor vehicle; the motor vehicle thus only has the first axle and the second axle. Correspondingly the motor vehicle can be operated at least temporarily as all-wheel-drive vehicle.

Such a drive device enables in a simple manner selectively driving only the first axle, only the second axle or the second axle and the first axle. However, because the first axle of the motor vehicle can be operatively connected with the internal combustion engine, it is referred to as primary axle, while the second axle represents a secondary axle. Preferably the second axle is only driven by means of the second electric motor when at the same time the first axle is also driven with the internal combustion engine and/or the first electric motor. It can thus be provided that the second electric motor is only operated for driving the second axle when also the internal combustion engine, the first electric motor or both are operated, i.e., serve for providing a torque which acts on the first axle. The hybrid drive device serves for realizing the advantages of a single axle drive, i.e., in which only the first axle is driven, as well as a multiple axle drive, in which the first axle as well as the second axle of the motor vehicle are driven. However, the multiple axle drive adversely effects fuel consumption of the hybrid drive device and thus the vehicle.

From the state of the art the printed publication DE 10 2011 078 498 A1 is known. This document describes a method for operating a drive train of a vehicle, which includes driving first wheels by using an electric motor, starting a machine, using a second electric motor driven by the machine in order to generate a synchronous rotational speed at the input of the transmission with a desired set gear, engaging a clutch, which connects the input and the machine, and using the machine and the transmission in order to drive second wheels. Also the printed publications US 2006/0173593 A1, DE 10 2007 046 584 A1 and DE 10 2005 048 501 B3 are known from the state of the art.

SUMMARY OF THE INVENTION

It is an object of the invention to propose a method for operating a hybrid drive device, which does not have this disadvantage but in particular combines the advantages of the single axle drive and the multiple axle drive while at the same time reducing fuel consumption.

According to the invention this is achieved with a method for operating a hybrid drive device of a motor vehicle, including providing the hybrid drive device, wherein the hybrid drive device includes an internal combustion engine operatively connectable with a first axle of the motor vehicle, a first electric motor operatively connectable with the first axle, and a second electric motor operatively connectable with a second axle of the motor vehicle, wherein the hybrid drive device is operable in one of at least two operating modes, and in a first one and a second one of the at least two operating modes driving the first axle with the internal combustion engine and the second axle with the second electric motor, wherein in the first operating mode the second electric motor is operated with electric energy generated by driving the first electric motor with the internal combustion engine at an increased output of the internal combustion engine, and wherein in the second operating mode the second electric motor is operated with electric energy withdrawn exclusively from an energy storage for electric energy. It is provided that in a first operating mode as well as in a second operating mode the internal combustion engine is used for driving the first axle, and the second electric motor is used for driving the second axle, wherein the electric energy used to operate the second electric engine is generated in the first operating mode by the first electric motor which is driven by the internal combustion engine at increased output of the internal combustion engine, and in the second operating mode the energy is exclusively withdrawn from an energy storage for electric energy. The hybrid drive device can thus be operated in at least two operating modes, i.e., in the first operating mode and in the second operating mode. In both operating modes the second electric motor is to be operated in particular for driving the second axle of the motor vehicle. Preferably the internal combustion engine and/or the first electric motor are used at the same time in the first operating mode and also in the second operating ode for driving the first axle, so that the first axle and also the second axle of the motor vehicle are driven.

In the first operating mode it is provided to generate the electric energy required for operating the second electric motor by means of the first electric motor, which for this purpose is operated as a generator. Hereby the first electric motor is driven by the internal combustion engine. It is thus required to increase the output of the internal combustion engine in order to provide the torque or the output required by the first electric motor for generating the electric energy. This applies even more when the internal combustion engine is operatively connected with the first electric motor as well as with the first axle, i.e., it is also used for driving the first axle. In this case the internal combustion engine has to provide a torque or an output, which is sufficient for driving the first axle as well as for generating the electric energy required by the second electric motor by means of the first electric motor. The increase of the output of the internal combustion engine is also referred to as load increase.

This approach is required and useful for numerous operating ranges of the internal combustion engine. However, it has the disadvantage that at a time point at which the internal combustion engine is already subjected to load as a result of driving the first axle, i.e., is subjected to a defined load, additional output for operating the first electric motor has to be provided, in order to supply the second electric motor with a sufficient amount of electric energy. For this reason the second operating mode is provided. In the second operating mode, the electric energy used for operating the second electric motor is exclusively withdrawn from the energy storage. This means that in this case no increase of the output of the internal combustion engine is required and is also not initiated. For example in the second operating mode the first axle is only driven by means of the internal combustion engine, while the second axle is (only) driven by means of the second electric motor, wherein the electric energy required therefore is withdrawn from the energy storage.

This means that the first electric motor is not operated in the second operating mode. As an alternative it can of course also be provided that the first axle is driven with the internal combustion engine as well as with the first electric motor. Hereby also the first electric motor is operated with energy withdrawn from the energy storage. Such an approach can serve for performing a so-called "boost operation".

Also in the second operating mode the second electric motor serves for driving the second axle. In this case it is preferably provided that the first electric motor as well as the second electric motor are exclusively operated with the electric energy withdrawn from the energy storage. In the second operating mode the disadvantages mentioned above for the first operating mode are avoided. The energy storage can for example be charged by means of the first electric motor, which for this purpose is driven by the internal combustion engine. This may occur however at a time point at which an increase of the output of the internal combustion engine has no adverse effect, in particular on a driving comfort of the motor vehicle.

A further embodiment of the invention provides that the output of the internal combustion engine is increased in the first operating mode so that the second electric motor is operated exclusively with the electric energy generated by the first electric motor. In particular it is not provided to additionally withdraw electric energy from the energy storage in order to drive the second electric motor. This is to be solely accomplished by means of the electric energy, which is generated by means of the first electric motor. This means that the output of the internal combustion engine has to be correspondingly increased, in particular by taking the efficiency of the first electric motor and the second electric motor into account. Thus when the efficiencies are smaller than 1 the output of the internal combustion engine has to be increased by an output differential that is greater than the output provided by the second electric motor for driving the second axle.

In a further preferred embodiment of the invention it is provided that in a third operating mode the energy storage is charged by means of the first electric motor, which is driven by the internal combustion engine at increased output of the internal combustion engine. The charging of the energy storage mentioned above is thus performed in the third operating mode. This also requires increasing the output. In the third operating mode the output can however be increased independent of the output provided in the second operating mode by the second electric motor for driving the second axle. In particular the output can be increased to an operating point, which in particular has favorable operating characteristics, for example a low fuel consumption and/or low pollutant emission.

Hereby it can for example be provided that in the third operating mode the output of the internal combustion engine is increased by an output differential, which is smaller than the (average) electric output, which was taken up by the second electric motor in the second operating mode. For this, the increase of the output can however extend over a period of time that is longer that the period of time over which the second operating mode was performed. This ensures a high comfort of the passengers in the motor vehicle also in the third operating mode.

An advantageous embodiment of the invention provides that when a torque generated by the second electric motor is requested when the charge level of the energy storage falls below a first threshold value the first operating mode is selected and otherwise the second operating mode is selected. Thus as soon as the second electric motor is to be operated in order to drive the second axle, it has to be decided in which way to generate the electric energy required therefore. In the first operating mode the energy is generated by means of the first electric motor, while in the second operating mode the electric energy is exclusively withdrawn from the energy storage. For this reason it is advantageous when the decision which operating mode to apply is made dependent on the charge state of the energy storage. This energy storage is for example constructed as accumulator, in particular as high-voltage battery.

When the charge state is too low, operating the second electric motor exclusively with electric energy withdrawn from the energy storage is not possible. Correspondingly the first operating mode is selected when the charge state falls below the first threshold value. Preferably this is already tested prior to starting operation of the second electric motor. Of course the operating mode can also be changed during operation of the second electric motor. When for example the hybrid drive device is operated in the second operating mode because when requesting the torque generated by the second electric motor the charge state of the energy storage was still sufficiently high, in particular exceeded the first threshold value, and falls below the first threshold value during operation of the second electric motor for driving the second axle, it is advantageous to change from the second operating mode into the first operating mode, even when this may adversely affect the driving comfort of the occupants of the motor vehicle.

A further embodiment of the invention provides that the third operating mode is selected when no torque generated by the second electric motor is requested and an expected sound emission generated as a result of the increase of the output of the internal combustion engine is smaller than a threshold value. The energy storage is thus preferably only charged when the second axle is not driven or is not intended to be driven. As second condition for initiating or carrying out the third operating mode the expected sound emission is used. When the latter is greater or equal to the threshold value, the third operating mode is not initiated or, in case it was already initiated, the third operating mode is terminated. This can for example be the case when the internal combustion engine is already operated at an operating point with very low sound emission. Any increase of the sound emission would now be negatively perceived by the occupants of the motor vehicle, and is to be avoided.

A further embodiment of the invention provides that the third operating mode is only selected when the charge state of the energy storage is smaller than a second threshold value. This condition can be used in addition to or separately from the aforementioned conditions. Of course a charging of the energy storage is not required when the energy storage already has a sufficient charge state, i.e., the charge state is greater than the second threshold value. The second threshold value can be equal to the first threshold value. Advantageously, however, it is different from, in particular greater than, the first threshold value so that a sufficient charge state is always available for the expected demand on the second electric motor for generating a torque.

It can also be provided that the internal combustion engine and the first electric motor are operated as parallel hybrid drive arrangement. For example for this purpose a separating clutch is provided in the operative connection between the internal combustion engine and the first electric motor, while the first electric motor is operatively connected with the first axle, either permanently or also via a separating clutch. In the operative connection between the first electric motor and the first axle a transmission, in particular a manual transmission, can be provided. In such an embodiment the internal combustion engine is only operatively connectable with the first axle via the first electric motor. The first axle is thus either driven solely by means of the first electric motor, or simultaneously by the internal combustion engine and the first electric motor. In the latter case the internal combustion engine and the first electric motor simultaneously provide the torque required for driving the first axle.

The invention also relates to a hybrid drive device of a motor vehicle, in particular for implementing the method described above, wherein the hybrid drive device has an internal combustion engine, which can be operatively connected with a first axle of the motor vehicle, a first electric motor which can also be operatively connected with the first axle, and a second electric motor which can be operatively connected with a second axle of the motor vehicle. Hereby it is provided that in a first operating mode as well as in a second operating mode the internal combustion engine is used for driving the first axle and the second electric motor is used for driving the second axle, wherein the hybrid drive device is configured to generate the electric energy used to operate the second electric motor in the first operating mode by driving the first electric motor with the internal combustion engine at increased output of the internal combustion engine, and in the second operating mode to withdraw the electric energy exclusively from an energy storage for electric energy. The advantages of such a configuration of the hybrid drive device and the method were already explained. The hybrid drive device and the method can be refined according to the description above so that this description is not repeated here.

The invention also relates to a motor vehicle with a hybrid drive device, wherein the latter is in particular provided for implementing the method described above. The hybrid drive device has an internal combustion engine, which can be operatively connected with a first axle of the motor vehicle, a first electric motor operatively connected with the first axle, and a second electric motor operatively connected with the second axle of the motor vehicle. As described above it is provided that in the first operating mode and also in the second operating mode the internal combustion engine is used for driving the first axle and the second electric motor is used for driving the second axle, wherein the hybrid drive device is configured to generate the electric energy used to operate the second electric motor in the first operating mode by driving the first electric motor with: the internal combustion engine at increased output of the internal combustion engine, and in the second operating mode to withdraw the electric energy exclusively from an energy storage for electric energy.

It can be recognized that the first electric motor is permanently operatively connected with the first axle. This also applies to the second electric motor and the second axle. The internal combustion engine on the other hand can only be operatively connected with the first axle of the motor vehicle. This means that in the operative connection between the first axle and the internal combustion engine the aforementioned separating clutch is provided. For example the separating clutch is present in the operative connection between the internal combustion engine and the first electric motor, so that the first axle can be solely driven with the first electric motor or by the internal combustion engine and the first electric motor together.

BRIEF DESCRIPTION OF THE DRAWING

In the following, the invention is explained in more detail by way of the exemplary embodiments shown in the drawing without limiting the invention. It is shown in the sole FIGURE a schematic representation of a motor vehicle with a hybrid drive device.

DETAILED DESCRIPTION OF PREFERRED EMBODIMENTS

The FIGURE shows a schematic representation of a motor vehicle 1 with a hybrid drive device 2, which serves for driving a first axle 3 and a second axle 4 of the motor vehicle 1. The first axle 3 has wheels 5, the second axle has wheels 6. The first axle 3 is for example a front axle of the motor vehicle 1, while the second axle 4 is a rear axle. Of course the opposite arrangement is also possible. The hybrid drive device 2 includes multiple drive aggregates 7, wherein a first one of the drive aggregates 7 is constructed as internal combustion engine 8, a further one of the drive aggregates 7 as first electric motor 9 and another one of the drive aggregates 7 as second electric motor 10. The internal combustion engine 8 is operatively connected with the first electric motor 9 via a separating clutch 11. The electric motor 9 on the other hand is permanently operatively connected with the first axle 3, wherein a transmission 12, in particular a manual transmission and/or a differential 13 can be provided in the operative connection. The differential 13 serves of distributing a torque provided via the transmission between the wheels 5 of the first axle 3.

It can thus be recognized that it is possible to drive the first axle 3 solely by the first electric motor 9 or, in the case of an at least partially closed separating clutch 11, by the internal combustion engine 8 together with the first electric motor 9. The second electric motor 10 on the other hand is permanently operatively connected with the second axle 4 via a differential 14. Also in this case the differential serves for distributing a torque provided by the second electric motor 10 between the wheels 6 of the second axle 4. The first electric motor 9 as well as the second electric motor 10 are connected to an energy storage 15 for electric energy. They can be operated by means of the electric energy stored in the energy storage 15. Vice versa they can also serve for charging the energy storage 15 when operated as generator.

It is provided that the hybrid drive device 2 can be operated in at least two operating modes, i.e., a first operating mode and a second operating mode. In the first operating mode the energy required for operating the second electric motor 10 is generated by the first electric motor 9. For this purpose the first electric motor 9 is operated as generator and is operatively connected with the internal combustion engine when the separating clutch 11 is at least partially, in particular fully, closed. By means of the output provided by the internal combustion engine 8 the first electric motor 9 is thus operated for generating the electric energy for the second electric motor, and also the first axle 3 is driven. Correspondingly, compared to an operating mode, in which the second electric motor 10 is not operated, an increase of the output of the internal combustion engine 8 is required.

In the second operating mode on the other hand the electric energy, which serves for operating the second electric motor 10, is to be exclusively withdrawn from the energy storage 15. In this case the first electric motor 9 is preferably not operated so that the first axle 3 is driven only by means of the internal combustion engine 8 and the second axle 4 only by means of the second electric motor 10. In this way the advantages of a single axle drive and a multiple axle drive can be realized at the same time. In particular an increase of sound emission is avoided by increasing the output by using the second operating mode. The electric energy withdrawn from the energy storage 15 during the second operating mode can subsequently be replenished in a third operating mode, by using the first electric motor 9 and/or the second electric motor 10 as generators. Preferably, however, only the first electric motor 9 is used to charge the energy storage 15.

What is claimed is:

1. A method for operating a hybrid drive device of a motor vehicle, comprising:
    providing the hybrid drive device, said hybrid drive device comprising an internal combustion engine operatively connectable with a first axle of the motor vehicle, a first electric motor operatively connectable with the first axle, and a second electric motor operatively connectable with a second axle of the motor vehicle, said hybrid drive device being operable in one of at least two operating modes;
    in a first one and a second one of the at least two operating modes driving the first axle with the internal combustion engine and the second axle with the second electric motor, wherein in the first operating mode the second electric motor is operated with electric energy generated by driving the first electric motor with the internal combustion engine at an increased output of the internal combustion engine that is greater than the output provided by the second electric motor for driving the axle when the efficiencies are smaller than 1 of the first electric motor and the second electric motor, and wherein in the second operating mode the second electric motor is operated with electric energy withdrawn exclusively from an energy storage for electric energy; and
    further comprising operating the hybrid drive device in the first operating mode when a charge state of the energy storage falls below a first threshold value at a time when demanding a torque generated by the second electric motor, and operating the hybrid device in the second operating mode when the charge state of the energy storage does not fall below the first threshold value at the time when demanding the torque generated by the second electric motor.

2. The method of claim 1, wherein the increased output of the internal combustion engine causes the first electric motor to generate an amount of electric energy sufficient to exclusively operate the second electric motor with the electric energy generated by the first electric motor.

3. The method of claim 1, wherein the hybrid drive device is operable in a third operating mode in which the energy storage is charged by means of the first electric motor driven by the internal combustion engine at the increased output of the internal combustion engine.

4. The method of claim 3, further comprising operating the hybrid drive device in the third operating mode when no torque generated by the second electric motor is requested and when an expected sound emission resulting from the increased output of the internal combustion engine during a charging of the energy storage is smaller than a first threshold value.

5. The method of claim 4, wherein the hybrid drive device is only operated in the third operating mode when the charge state of the energy storage is smaller than a second threshold value.

6. The method of claim 1, wherein the internal combustion engine and the first electric motor are operated as parallel hybrid drive device.

7. A hybrid drive device of a motor vehicle, comprising,
    an internal combustion engine operatively connectable with a first axle of the motor vehicle;
    a first electric motor operatively connectable with the first axle; and
    a second electric motor operatively connectable with a second axle of the motor vehicle, said hybrid drive device being operable in one of at least two operating modes,
    wherein in a first one and a second one of the at least two operating modes the internal combustion engine drives the first axle and the second electric motor drives the second axle, wherein in the first operating mode the second electric motor is operated with electric energy generated the first electric motor driven with the internal combustion engine at an increased output of the internal combustion engine that is greater than the output provided by the second electric motor for driving the axle when the efficiencies are smaller than 1 of the first electric motor and the second electric motor, wherein in the second operating mode the second electric motor is operated with electric energy withdrawn exclusively from an energy storage for electric energy, and wherein the hybrid drive device is operated in the first operating mode when a charge state of the energy storage falls below a first threshold value at a time when demanding a torque generated by the second electric motor, and the hybrid device is operated in the second operating mode when the charge state of the energy storage does not fall below the first threshold value at the time when demanding the torque generated by the second electric motor.

8. A motor vehicle, comprising:
a hybrid drive device, said hybrid drive comprising, an internal combustion engine operatively connectable with a first axle of the motor vehicle;
a first electric motor operatively connectable with the first axle; and
a second electric motor operatively connectable with a second axle of the motor vehicle, said hybrid drive device being operable in one of at least two operating modes, wherein in a first one and a second one of the at least two operating modes the internal combustion engine drives the first axle and the second electric motor drives the second axle,
wherein in the first operating mode the second electric motor is operated with electric energy generated by the first electric motor driven with the internal combustion engine at an increased output of the internal combustion engine that is greater than the output provided by the second electric motor for driving the axle when the efficiencies are smaller than 1 of the first electric motor and the second electric motor, wherein in the second operating mode the second electric motor is operated with electric energy withdrawn exclusively from an energy storage for electric energy, and
wherein the hybrid drive device is operated in the first operating mode when a charge state of the energy storage falls below a first threshold value at a time when demanding a torque generated by the second electric motor, and the hybrid device is operated in the second operating mode when the charge state of the energy storage does not fall below the first threshold value at the time when demanding the torque generated by the second electric motor.

\* \* \* \* \*